United States Patent
Jacob et al.

(10) Patent No.: US 8,906,489 B2
(45) Date of Patent: Dec. 9, 2014

(54) METHOD FOR PRODUCING A FIBRE COMPOSITE COMPONENT FOR AVIATION AND SPACEFLIGHT

(75) Inventors: Torben Jacob, Beckdorf (DE); Joachim Piepenbrock, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 1559 days.

(21) Appl. No.: 12/308,792

(22) PCT Filed: Jul. 5, 2007

(86) PCT No.: PCT/EP2007/056788
§ 371 (c)(1),
(2), (4) Date: Dec. 8, 2010

(87) PCT Pub. No.: WO2008/003733
PCT Pub. Date: Jan. 10, 2008

(65) Prior Publication Data
US 2011/0076461 A1    Mar. 31, 2011

(30) Foreign Application Priority Data
Jul. 6, 2006   (DE) .......................... 10 2006 031 334

(51) Int. Cl.
*B29C 33/40* (2006.01)
*B29C 70/34* (2006.01)
*B29C 33/50* (2006.01)

(52) U.S. Cl.
CPC ............... *B29C 33/505* (2013.01); *B29C 70/34* (2013.01); *Y02T 50/433* (2013.01); *Y02T 50/43* (2013.01)
USPC .......................................... 428/178; 264/219

(58) Field of Classification Search
USPC ................. 264/511, 512, 515, 516, 313, 314; 156/156; 425/503
See application file for complete search history.

(56) References Cited

U.S. PATENT DOCUMENTS

| | | | |
|---|---|---|---|
| 2,244,107 | A | 6/1941 | Hayes |
| 3,143,306 | A | 8/1964 | Dijkmans et al. |

(Continued)

FOREIGN PATENT DOCUMENTS

| | | |
|---|---|---|
| CH | EP1197309 | 4/2002 |
| DE | 1604528 | 11/1970 |

(Continued)

OTHER PUBLICATIONS

Japanese Office Action for Application Serial No. JP 2009-517267 dated Jul. 11, 2012.

(Continued)

*Primary Examiner* — Galen Hauth
(74) *Attorney, Agent, or Firm* — Jenkins, Wilson, Taylor & Hunt, P.A.

(57) ABSTRACT

Method for producing a fiber composite component, in particular for aerospace, having the following method steps: forming a moulding core that comprises a predetermined number of hollow bodies for defining an external geometry of the moulding core, the hollow bodies being designed such that they extend in the longitudinal direction of the moulding core and are expandable elastically at least in their lateral direction, and are fixed to one another, the formed moulding core having a flexible outer layer for smoothing the contour of its outer surfaces, and a core sleeve surrounding the moulding core, for sealing the moulding core from the fiber composite component to be produced; placing at least one fiber semi-finished product, at least in places, on the moulding core (that has been formed, in order to shape at least one moulding section of the fiber composite component to be produced; and applying heat and/or pressure to the at least one moulding section in order to produce the fiber composite component.

13 Claims, 3 Drawing Sheets

(56) References Cited

U.S. PATENT DOCUMENTS

| | | | |
|---|---|---|---|
| 3,279,739 | A | 10/1966 | Long |
| 3,279,741 | A | 10/1966 | Long |
| 3,551,237 | A | 12/1970 | Cox et al. |
| 3,629,030 | A | 12/1971 | Ash |
| 3,754,717 | A | 8/1973 | Saidla |
| 3,795,559 | A * | 3/1974 | Horn et al. ............. 156/152 |
| 3,995,081 | A | 11/1976 | Fant et al. |
| 4,094,688 | A | 6/1978 | Wolf |
| 4,155,970 | A | 5/1979 | Cassell |
| 4,248,817 | A | 2/1981 | Frank |
| 4,271,116 | A | 6/1981 | Jones |
| 4,503,105 | A | 3/1985 | Tomioka |
| 4,520,988 | A | 6/1985 | Walker |
| 4,758,397 | A | 7/1988 | Schreiner et al. |
| 4,871,599 | A | 10/1989 | Knorr |
| 4,943,334 | A | 7/1990 | Medney |
| 5,041,315 | A | 8/1991 | Searle et al. |
| 5,045,251 | A | 9/1991 | Johnson |
| 5,176,864 | A | 1/1993 | Bates et al. |
| 5,262,121 | A | 11/1993 | Goodno |
| 5,376,326 | A | 12/1994 | Medney |
| 5,387,098 | A | 2/1995 | Willden |
| 5,505,492 | A | 4/1996 | Nelson |
| 5,527,414 | A | 6/1996 | Dublinski et al. |
| 5,931,830 | A | 8/1999 | Jacobsen et al. |
| 5,989,481 | A | 11/1999 | You |
| 6,013,125 | A | 1/2000 | Quraishi et al. |
| 6,458,306 | B1 | 10/2002 | Nelson et al. |
| 6,458,309 | B1 | 10/2002 | Allen |
| 6,562,436 | B2 | 5/2003 | George et al. |
| 6,632,502 | B1 | 10/2003 | Allen et al. |
| 6,638,466 | B1 | 10/2003 | Abbott |
| 6,692,681 | B1 | 2/2004 | Lunde |
| 6,889,937 | B2 * | 5/2005 | Simpson et al. ........... 244/123.1 |
| 7,192,543 | B2 | 3/2007 | Malfliet |
| 7,294,220 | B2 | 11/2007 | Anderson |
| 7,531,058 | B2 | 5/2009 | Grose et al. |
| 8,500,085 | B2 | 8/2013 | Jacob et al. |
| 2002/0022422 | A1 | 2/2002 | Waldrop et al. |
| 2002/0038923 | A1 | 4/2002 | Lenherr |
| 2002/0056788 | A1 | 5/2002 | Anderson et al. |
| 2003/0183983 | A1 | 10/2003 | Schmidt |
| 2004/0103918 | A1 | 6/2004 | Teufel et al. |
| 2004/0216805 | A1 | 11/2004 | Teufel |
| 2005/0002269 | A1 | 1/2005 | Longo |
| 2005/0211843 | A1 | 9/2005 | Simpson et al. |
| 2005/0230552 | A1 * | 10/2005 | Engwall et al. ............. 244/133 |
| 2007/0096368 | A1 * | 5/2007 | Hanson et al. ............. 264/314 |
| 2007/0108665 | A1 | 5/2007 | Glain et al. |
| 2009/0166921 | A1 | 7/2009 | Jacob et al. |
| 2009/0166935 | A1 | 7/2009 | Jacob et al. |
| 2010/0007044 | A1 | 1/2010 | Jacob et al. |
| 2010/0044912 | A1 | 2/2010 | Zahlen et al. |
| 2010/0092708 | A1 | 4/2010 | Jacob et al. |
| 2010/0307694 | A1 | 12/2010 | Dieckmann |

FOREIGN PATENT DOCUMENTS

| | | |
|---|---|---|
| DE | 1671756 | 10/1971 |
| DE | EP0002711 | 7/1979 |
| DE | 8711336 | 10/1987 |
| DE | 277234 | 3/1990 |
| DE | 3911312 | 4/1990 |
| DE | 4224526 | 1/1994 |
| DE | 10342867 | 4/2005 |
| DE | WO2008003715 | 1/2008 |
| DE | WO2008003721 | 1/2008 |
| DE | WO2008003733 | 1/2008 |
| DE | WO2008003740 | 1/2008 |
| DE | WO2008003767 | 1/2008 |
| DE | WO2008003768 | 1/2008 |
| EP | 0212140 | 3/1987 |
| EP | 0291203 | 4/1988 |
| EP | 0491650 | 6/1992 |
| FR | 2745745 | 9/1997 |
| FR | WO2007107553 | 9/2007 |
| GB | 1522432 | 8/1978 |
| GB | 2292332 | 4/1994 |
| GB | 2284173 | 5/1995 |
| GB | WO9514563 | 6/1995 |
| IT | EP0735639 | 10/1996 |
| JP | 58-018240 | 2/1983 |
| JP | 59-157807 | 10/1984 |
| JP | 61-188425 | 8/1986 |
| JP | 63-310310 | 12/1988 |
| JP | 2248239 | 10/1990 |
| JP | 04-265714 | 9/1992 |
| JP | 06-106632 | 4/1994 |
| JP | 08-142060 | 6/1996 |
| JP | 08-203751 | 8/1996 |
| JP | 08207134 | 8/1996 |
| JP | 11090979 | 4/1999 |
| JP | 2003-071864 | 3/2003 |
| JP | 2003-103643 | 4/2003 |
| JP | 03-277532 | 10/2003 |
| JP | DE69811606 | 2/2004 |
| JP | 2006-512240 | 4/2006 |
| JP | 08-203751 | 9/2008 |
| RU | 2080750 | 5/1997 |
| RU | 2143341 C1 | 12/1999 |
| RU | 2217312 | 11/2003 |
| RU | 2242369 C1 | 12/2004 |
| RU | 2271276 C2 | 3/2006 |
| RU | 2285613 C1 | 10/2006 |
| SE | WO9851481 | 11/1998 |
| SE | EP1762355 | 3/2007 |
| SU | 204550 | 10/1967 |
| SU | 433038 | 6/1974 |
| SU | 1123235 A2 | 2/1993 |
| WO | WO2008701650 | 3/1987 |
| WO | WO 88/01938 | 3/1988 |
| WO | WO00/01520 | 1/2000 |
| WO | WO2004/000643 | 12/2003 |
| WO | WO2005105402 | 11/2005 |

OTHER PUBLICATIONS

Japanese Office Action for Application Serial No. JP 2009-517264 dated Jul. 11, 2012.
Japanese Office Action for Application Serial No. JP 2009-517271 dated Jul. 11, 2012.
Non-Final Office Action for U.S. Appl. No. 12/227,679 dated Dec. 6, 2011.
Final Office Action for U.S. Appl. No. 12/309,083 dated Dec. 7, 2011.
Final Office Action for U.S. Appl. No. 12/227,679 dated Jul. 2, 2012.
V.P. Pustovoitov "Fibreglasses in building construction", Moscow, Stroyzdat, pp. 64-65 (1978).
"Hand Book of Adhesives" pp. 80-81 (1980).
Decision on Grant for Russian Patent Application No. 2009102870/05(003680) dated Jun. 8, 2011.
Advisory Action for U.S. Appl. No. 12/309,083 dated Jun. 9, 2011.
Decision on Grant for Russian Patent Application No. 2009102868/05(003677) dated Jun. 16, 2011.
Non-Final Office Action for U.S. Appl. No. 12/227,679 dated Nov. 21, 2012.
Chinese Grant for Application Serial No. 200780021406.6 dated Oct. 10, 2012.
Non-Final Office Action for U.S. Appl. No. 12/309,015 dated Dec. 5, 2012.
Notice of Allowance for U.S. Appl. No. 12/227,659 dated Dec. 6, 2012.
Chinese Grant Notification for CN Appl. No. 2007 8002 5659.0 dated Feb. 1, 2012.
Office Action/Restriction Requirement for U.S. Appl. No. 12/308,793 dated Mar. 19, 2012.
Office Action/Restriction Requirement for U.S. Appl. No. 12/309,015 dated Apr. 13, 2012.
Non-Final Office Action for U.S. Appl. No. 12/309,083 dated Apr. 23, 2012.

(56) References Cited

OTHER PUBLICATIONS

Notice of Allowance for U.S. Appl. No. 12/227,659 dated Apr. 24, 2012.
Decision to Grant for Russian Appication No. 2009/102869/05(003679) dated Jun. 24, 2011.
Decision to Grant for Russian Application No. 2009/103204/05(004166) dated Jun. 24, 2011.
Non-Final Office Action for U.S. Appl. No. 12/227,659 dated Aug. 3, 2011.
Advisory Action for U.S. Appl. No. 12/227,679 dated Jul. 2, 2010.
Non-Final Office Action for U.S. Appl. No. 12/227,679 dated Aug. 2, 2010.
Non-Final Office Action for U.S. Appl. No. 12/309,083 dated Aug. 16, 2011.
Non-Final Office Action for U.S. Appl. No. 12/227,659 dated Nov. 1, 2011.
AIRTECH, Masterflex "S" Series (Mar. 24, 1997).
Final Office Action for U.S. Appl. No. 12/227,679 dated Mar. 23, 2010.
Non-Final Office Action for U.S. Appl. No. 12/309,083 dated Nov. 15, 2010.
Final Office Action for U.S. Appl. No. 12/227,679 dated Jan. 19, 2011.
Final Office Action for U.S. Appl. No. 12/309,083 dated Apr. 4, 2011.
Decision to Grant (English) for Russian Application No. 2009/103205/05(004168) dated Oct. 19, 2011.
Non-Final Office Action for U.S. Appl. No. 12/308,793 dated Jun. 12, 2012.
Final Office Action for U.S. Appl. No. 12/227,679 dated Mar. 6, 2009.
Notice of Allowance for U.S. Appl. No. 12/227,659 dated Aug. 1, 2012.
Final Office Action for U.S. Appl. No. 12/309,083 dated Sep. 6, 2012.
Japanese Office Action for U.S. Appl. No. JP 2009-517271 (with Engl. Transl.) dated Jul. 11, 2012.
Final Office Action for U.S. Appl. No. 12/308,793 dated Nov. 6, 2012.
International Search Report and Written Opinion for PCT/EP/2007/056799 dated Sep. 26, 2007.
German Office Action for DE 10 2006 031 323.2 dated Mar. 16, 2007.
International Search Report and Written Opinion for PCT/EP/2007/056856 dated Oct. 29, 2007.
International Search Report and Written Opinion for PCT/EP/2007/056788 dated Oct. 29, 2007.
German Office Action for DE 10 2006 031 334.8 dated Mar. 15, 2007.
International Search Report and Written Opinion for PCT/EP/2007/056767 dated Nov. 8, 2007.
German Office Action for DE 10 2006 031 326.7 dated Mar. 14, 2007.
International Search Report and Written Opinion for PCT/EP/2007/056855 dated Sep. 25, 2007
German Office Action for DE 10 2006 031 335.6 dated Mar. 15, 2007.
International Search Report and Written Opinion for PCT/EP/2007/056743 dated Nov. 14, 2007.
German Office Action for DE 10 2006 031 336.4 dated Mar. 21, 2007.
Japanese Office Action for Application No. 2009-517281 dated Oct. 5, 2012.
Notice of Allowance for U.S. Appl. No. 12/227,659 dated Feb. 21, 2013.
Non-Final Office Action for U.S. Appl. No. 12/227,679 dated Sep. 16, 2009.
Grant Decision (English) for Russian Application No. 2009103203/05(004165) dated Sep. 5, 2011.
Non-Final Office Action for U.S. Appl. No. 12/309,083 dated Dec. 2, 2013.
"Ceramic Membranes," www.lenntech.com/ceramic-membranes.htm, 2012.
Notice of Allowance for U.S. Appl. No. 12/227,659 dated Apr. 12, 2013.
Non-Final Office Action for U.S. Appl. No. 12/308,793 dated May 29, 2013.
Final Office Action for U.S. Appl. No. 12/227,679 dated Jun. 28, 2013.
Final Office Action for U.S. Appl. No. 12/309,015 dated Jul. 1, 2013.
Final Office Action for U.S. Appl. No. 12/309,083 dated Aug. 1, 2013.
Non-Final Office Action for U.S. Appl. No. 12/227,679 dated Oct. 24, 2013.
Non-Final Office Action for U.S. Appl. No. 12/309,015 dated Oct. 28, 2013.
Final Office Action for U.S. Appl. No. 12/308,793 dated Nov. 12, 2013.
Non-Final Office Action for U.S. Appl. No. 12/309,083 dated Mar. 19, 2013.

* cited by examiner

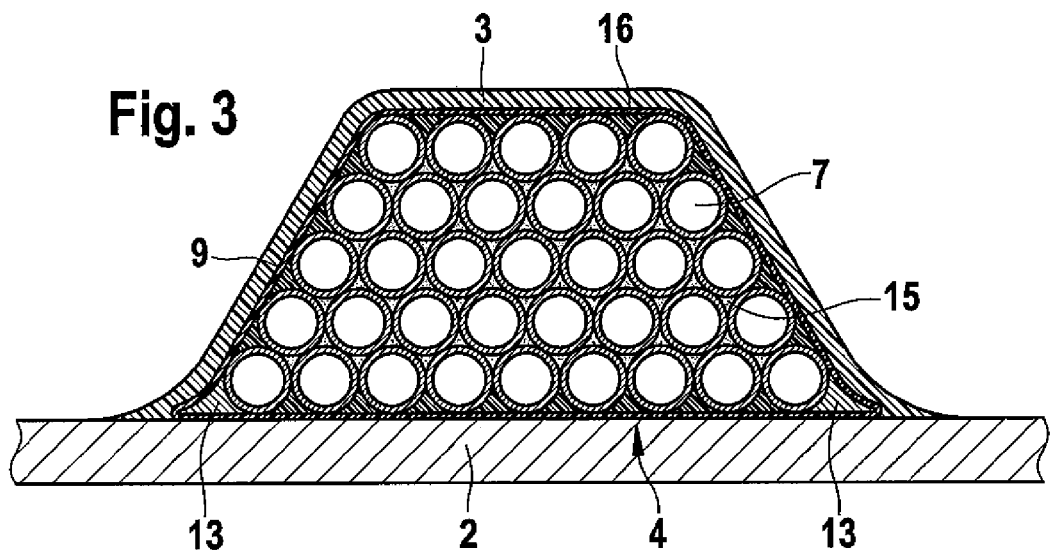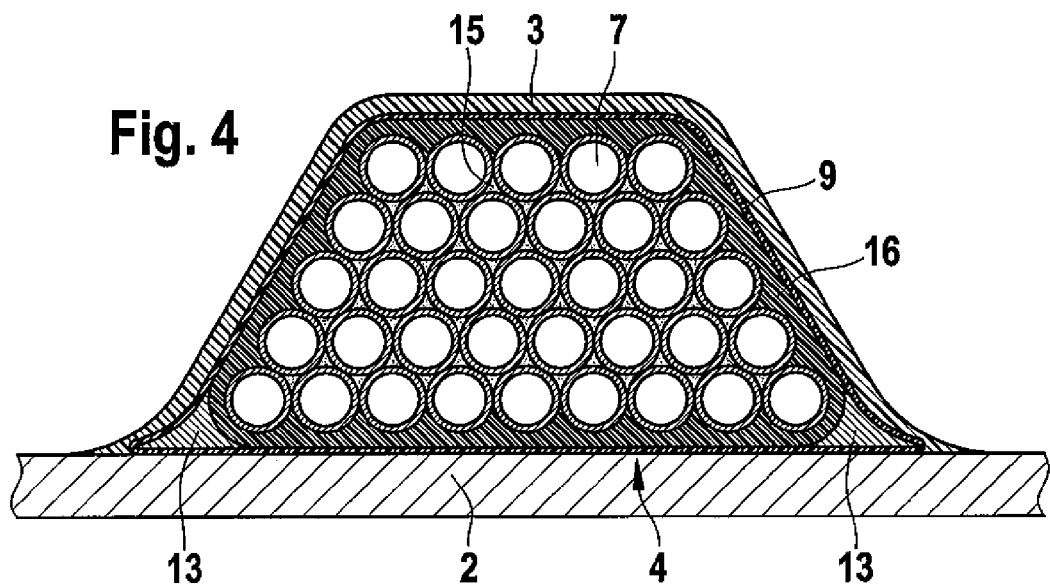

METHOD FOR PRODUCING A FIBRE COMPOSITE COMPONENT FOR AVIATION AND SPACEFLIGHT

FIELD OF THE INVENTION

The present invention relates to a method for producing a fibre composite component, in particular for aerospace, to a moulding core for producing such a fibre composite component, and to a fibre composite component having at least one stringer, which is produced by such moulding core and/or such a method.

Although it can be applied to any desired fibre composite components, the present invention and the problem on which it based will be explained in more detail in the following text with reference to flat, stringer-reinforced carbon fibre plastic (CFP) components, for example skin shells for an aircraft.

BACKGROUND OF THE INVENTION

It is generally known that CFP skin shells can be reinforced with CFP stringers in order to withstand high loads in aircraft, with as little additional weight as possible. In this case, a distinction is essentially drawn between two types of stringers: T stringers and Ω stringers.

T stringers have a cross section composed of a base and a stem. The base forms the connection surface to the skin shell. The use of skin shells reinforced by T stringers is widespread in aircraft construction.

Ω stringers have an approximately top-hat-shaped profile, whose ends are connected to the skin shell. Ω stringers can either be adhesively bonded to the likewise cured shell when in the cured state themselves, or they can be cured at the same time as the shell using a wet-in-wet process. The latter is desirable because this is better from the process engineering point of view. However, supporting cores or moulding cores are required for wet-in-wet production of skin shells reinforced with Ω stringers, in order to fix and support the dimensionally unstable fibre semi-finished products in the desired Ω shape during the production process. Skin shells with Ω stringers have the advantage over T stringers that the infiltration capability during an infusion process for introduction of a matrix, for example of an epoxy resin, into the fibre semi-finished products is better. Infusion processes may be more cost-effective than other known methods for producing fibre composite components, such as the prepreg process, because this allows the use of lower-cost fibre semi-finished products.

However, one problem that arises in the production of Ω stringers is that the material used at present for the supporting core or moulding core is costly and can be removed only with difficulty after the formation of the Ω stringers, so that the material which remains in the stringers disadvantageously contributes to the total weight of the aircraft.

SUMMARY OF THE INVENTION

Against this background, it is one of the objects of the present invention to provide a lower-cost and lighter-weight fibre composite component, in particular for aerospace.

Accordingly, a method for producing a fibre composite component, in particular for aerospace, is provided that includes:

forming a moulding core that comprises a predetermined number of hollow bodies for defining an external geometry of the moulding core, the hollow bodies being designed such that they extend in the longitudinal direction of the moulding core and are expandable elastically at least in their lateral direction; and are fixed to one another, the formed moulding core having a flexible outer layer for smoothing the contour of its outer surfaces, and a core sleeve surrounding the moulding core, for sealing the moulding core from the fibre composite component to be produced;

placing at least one fibre semi-finished product, at least in places, on the moulding core that has been formed, in order to shape at least one moulding section of the fibre composite component to be produced; and applying heat and/or pressure to the at least one moulding section in order to produce the fibre composite component.

When the moulding core is used in an appropriate manner, these hollow bodies have an internal pressure applied to them, as a result of which they expand in the lateral direction and form the moulding core with the external geometry. For removal from the mould, the internal pressure is changed such that, for example, the cross section of the moulding core is reduced again. This allows the moulding core to be removed easily. A further advantage is may be that the moulding core is reusable.

Furthermore, a moulding core for producing a fibre composite component, such as a stringer on a base component for aerospace, is provided that has a predetermined number of hollow bodies, the hollow bodies extending in the longitudinal direction of the moulding core and being expandable elastically at least in their lateral direction, the hollow bodies being fixed to one another, and the moulding core comprising a flexible outer layer in order to smooth the contour of its outer surfaces, and a core sleeve surrounding the moulding core, in order to seal the moulding core from the fibre composite component to be produced.

Furthermore, a fibre composite component is provided having at least one stringer, in particular for aviation and spaceflight, which is produced by means of the moulding core according to the invention and/or the method according to the invention.

The present invention therefore may provide the advantage over the initially mentioned approaches that the fibre composite component can be produced by means of a low-cost moulding core. Instead of a conventional costly core material which remains in the component, it is advantageously possible to use a reusable moulding core, whose shape can be varied in a simple manner by application of an internal pressure, such that it can easily be removed from the mould. In consequence, the moulding core no longer contributes to the component weight.

With a moulding core such as this, the hollow bodies may be fixed to one another, and the moulding core formed in this way may be provided with a flexible outer layer in order to smooth the contour of the outer surfaces of the moulding core. This may smooth the outer surfaces of the moulding core. The flexibility of the outer layer means that the hollow bodies can expand and contract flexibly in the lateral direction, in a simple manner.

One alternative embodiment provides for the outer layer to be applied such that it completely surrounds the hollow bodies 7, and forms their fixing to one another.

In one embodiment, the moulding core is completely surrounded by a core sleeve which, on removal from the mould, results in advantageous separation between the moulding section and the surfaces of the moulding core. Furthermore, the core sleeve prevents the pressure medium, for example air, from being able to escape into the fibre composite component in the event of any leakage from a small tube. At the same time, this prevents damage and adverse effects to the moulding core, thus ensuring that it can be reused.

According to one embodiment of the invention, reinforcing means are arranged inside or outside the core sleeve in the area of transitions, which have to be formed with sharp edges, in the external geometry of the moulding core to be formed. These reinforcing means, in particular corner profile parts, have the advantage that they form the sharp edges and corners, and the moulding core can be provided with rounded areas, which can be produced easily, in this region.

A separating layer can be applied to the core sleeve and prevents adhesion of the fibre semi-finished product and/or of a matrix to the core sleeve. This makes it easier to remove the core sleeve after the at least partial curing of the section of the fibre composite component created by means of the moulding core.

Fibre semi-finished products include fabric, tissue and fibre mats. These are provided with a matrix, for example an epoxy resin, and are then cured, for example in an autoclave.

According to a further embodiment of the invention, the moulding core is arranged on a base part composed of fibre composite semi-finished products, and/or is at least partially surrounded by fibre semi-finished products in order to form at least one moulding section of the fibre composite component. This advantageously allows base parts, for example skin shells, pressure cups etc., to be formed with Ω stringers. Alternatively or additionally, separate fibre composite components may also be produced, which are produced with their shape being defined entirely by the moulding core.

During the production of an Ω stringer, for example, the core sleeve is removed from the mould in the longitudinal direction of the stringer when removing it from the mould. In consequence, the core then no longer contributes to the total weight of the aircraft.

BRIEF DESCRIPTION OF THE DRAWINGS

The present invention is explained in more detail below using preferred exemplary embodiments and with reference to the attached figures of the drawings, in which:

FIG. 3 shows a schematic section illustration of a first moulding core according to the invention for the fibre composite component as shown in FIG. 1;

FIG. 4 shows a schematic section illustration of a second moulding core according to the invention for the fibre composite component as shown in FIG. 1;

In the figures, like reference numerals refer to identical or functionally identical components unless otherwise stated.

DETAILED DESCRIPTION OF THE INVENTION

Figure 1:
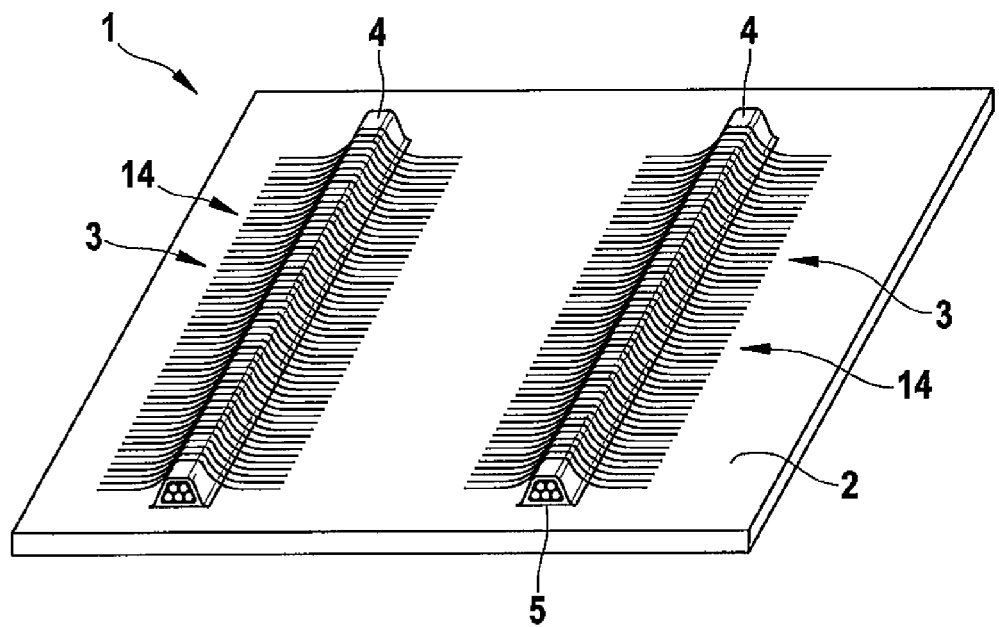
FIG. 1 shows a schematic perspective view of a first exemplary embodiment of a fibre composite component during production using one method according to the invention.

FIG. 1 shows a schematic perspective view of a first exemplary embodiment of a fibre composite component 1 during production using a method according to the invention.

This example has two moulding cores 4, although the number is not restricted to this. The two moulding cores 4, whose production will be explained further below, are provided with an approximately trapezoidal cross section, with their base 5 resting on a base component 2.

Fibre semi-finished products 3 are placed down on the moulding cores 4. The fibre semi-finished products 3 in this case rest with a central section on the outer surface of the moulding cores 4, and with their ends on the base component 2, for example on an aircraft skin. Two moulding sections 14 of the fibre composite component 1 are thus formed.

Various manufacturing methods can be used to process the fibre composite material. The so-called infusion process may be chosen in order to introduce a matrix, that is to say for example epoxy resin, into the fibre semi-finished products. The prepreg process may, however, be used just as well in this case.

A further step that of curing the base component 2 together with the moulding cores 4 and the fibre semi-finished product in an autoclave or oven under the influence of heat and pressure, using a curing cycle which will not be explained in any more detail, thus resulting in the production of a complete fibre composite component 1.

First of all, the production of the moulding cores 4 will be described with reference to FIGS. 2 to 4.

Figure 2:
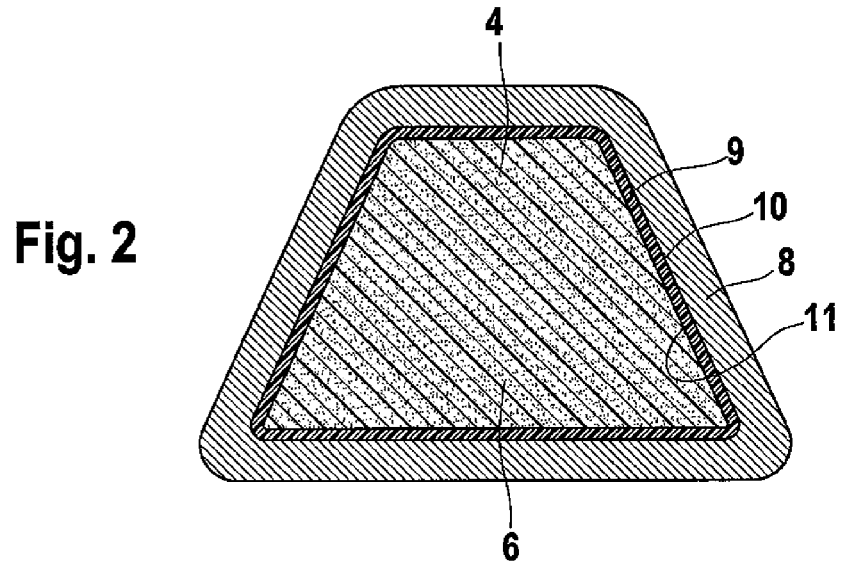
FIG. 2 shows a schematic general section illustration of a moulding core for the fibre composite component shown in FIG. 1.

FIG. 2 shows a schematic, general section illustration of a moulding core 4 according to the invention for the fibre composite component 1 as shown in FIG. 1, in the form of a cross section.

The moulding core 4, whose construction will be described in detail further below, has a cross section 6 which is introduced into a mould 8 and is changed in this mould to the desired shape, in this case an approximately trapezoidal shape. In this example, the moulding core 4 is surrounded by a core sleeve 9, which completely surrounds the moulding core 4 and is suitable, in terms of temperature and pressure, for its production process and its further treatment and processing. The core sleeve 9 is manufactured from a plastic, in particular a polyamide and/or a PTFE plastic. Its inside 11 rests directly on the surfaces of the moulding core 4, with its outside 10 in this example being coated with a separating (mold release) layer (not shown), which may also comprise an additional sleeve. The separating layer is used to correctly separate the moulding core 4 from the moulding section 14 during removal from the mould.

The moulding core 4 is composed of individual hollow bodies 7, as is illustrated in FIG. 3. In this example, the hollow bodies 7 are individual small tubes, for example in the form of thin films, with an approximately circular cross section, which are flexible in the lateral direction, that is to say in the radial direction. The hollow bodies 7 form an initially somewhat coarse structure for the cross section 6 of the moulding core 4. They are fixed to one another on their touching lines in the longitudinal direction, for example with the aid of suitable adhesive bonding. In this case, intermediate spaces 15 remain between them. The number of small tubes alongside one another and one above the other, as well as their diameters, may be chosen freely within certain limits, in order to achieve a desired cross section. In this example, the only feature is that the corner angle is set to 60°.

The outside of the moulding core 4 that is formed from the individual hollow bodies 7 is then provided with an outer layer 16, which contributes to smoothing its contour, and forms smooth surfaces for the moulding core 4, for example using the mould 8 (FIG. 2). This outer layer 16 fills external grooves between the hollow bodies 7.

In FIG. 3, reinforcing means 13 in the form of profiles, for example strips composed of metal or plastic, are used at the lower corners. The moulding core 4 can in this way be provided with particularly well-formed corner areas, by manufacturing the reinforcing means 13 in a separate mould. They may be arranged within the core sleeve 9 (not shown in FIG. 3), or else outside it.

The outer layer 16 is composed of a sufficiently flexible material, for example a suitable elastic plastic, which will reliably withstand the process temperatures that occur.

The outer layer can also be applied thicker in subareas, such that an otherwise fixed corner angle of 60° can be varied with certain limits.

The outer layer 16 can also be applied such that it completely surrounds the hollow bodies 7, and forms their fixing to one another. One example of a core such as this, which at the same time has a corner angle other than 60°, is illustrated in FIG. 4.

The moulding core 4 produced in this way is removed from the mould 8 and is applied to the base component 2 as described above. This state is illustrated in FIGS. 3 and 4. In this unpressurized state, the moulding core initially has a slightly smaller cross section. Internal pressure is then applied to the hollow bodies 7 such that the moulding core 4 assumes the desired external geometry. This will be explained in more detail further below. The moulding core 4 is then coated with the fibre semi-finished product 3 in order to form the moulding section 14, as explained above.

Figure 6:
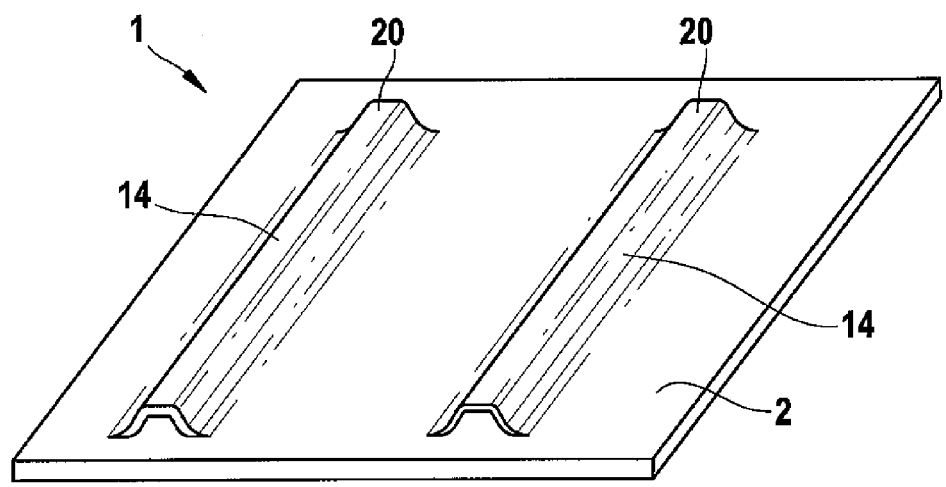
FIG. 6 shows a schematic perspective view of the finished fibre composite component as shown in FIG. 1, after removal of the moulding cores.

The fibre composite component 1 produced after a curing cycle, which will not be explained in any more detail, is illustrated in FIG. 6 in the form of a respective view after removal of the moulding cores 4 from the mould, with moulding sections 14 in the form of stringers 20.

Figure 5:
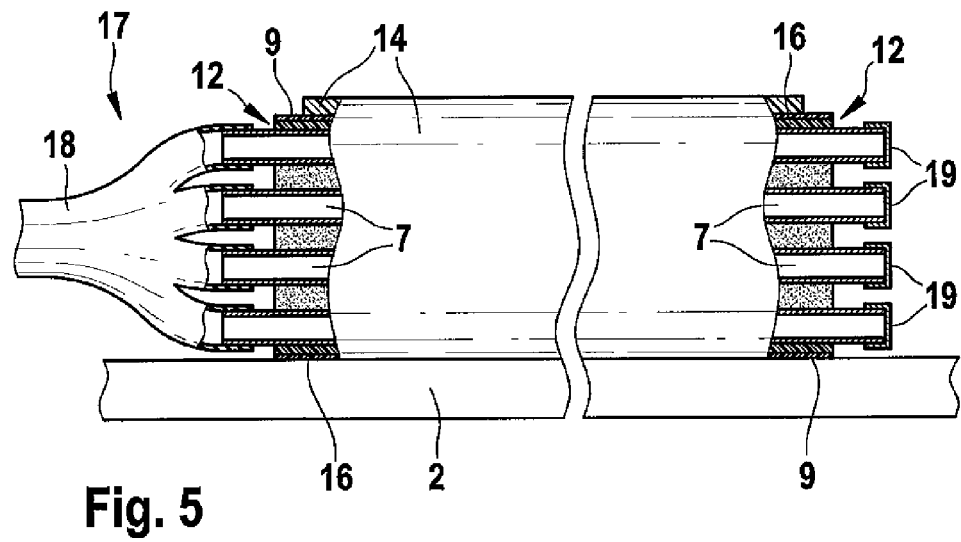
FIG. 5 shows a schematic side view of the first or second moulding core according to the invention as shown in FIG. 3 or 4.

FIG. 5 shows a side view of the moulding section 14, illustrated schematically. The moulding core 4 is arranged such that the core sleeve 9 projects at both ends, with its openings 12, out of the moulding section 14. This has the advantage that, if there are any leaks from the hollow bodies 7, the escaping air cannot enter the fibre semi-finished product 3 to be cured, but is passed to the exterior through the core sleeve 9. All of the ends of the hollow bodies 7 likewise project at both ends of the moulding section 14.

In this example, the right-hand ends of the moulding bodies 7 are closed by closures 19, and the other, opposite ends of the hollow bodies 7 are each connected to a connecting apparatus 17. This connection may be configured such that the connections are plugged onto the ends of the hollow bodies 7 or, as is shown in FIG. 5, are plugged into them. In this example, the connecting apparatus 17 comprises a line 18, which has branch ends that lead to each hollow body 7 and are connected to the hollow bodies 7.

The core sleeve 9, which has a circumference that is slightly larger than the circumference of the moulding core 4, is then pushed over it.

An internal pressure is applied via the connecting apparatus to the hollow bodies 7, expanding the hollow bodies 7 in their lateral direction, thus forming the desired external geometry of the moulding core 4. This is done before production of the moulding section 14, as explained above. The resultant enlargement of the circumference results in it being located tightly around the moulding core 4. The core sleeve 9 is clamped by the internal pressure applied during expansion of the moulding core 4.

The operation of this method is governed by the correct combination of a high internal pressure of, for example, 10 bar, which, however, still allows elastic, reversible, lateral expansion of the hollow bodies 7 at the curing temperature of, for example, 180° C., and a sufficiently small wall thickness for the hollow bodies 7 of, for example, 0.05 mm. Another critical factor in this case is the material, with a suitable compromise of the modulus of elasticity, low creepage tendency at the curing temperature with good resistance properties over time, and sufficiently good ductility. Possible materials in this case include, in particular, thermoplastics from the group of aromatic polysulphides and polysulphones, such as PSU, PPS or PES. These offer good long-term temperature resistance, with little creepage tendency, at temperatures such as these.

In this example, 35 hollow bodies 7 were used, each having a diameter of 5 mm. Reversible expansions of between 2 and 3% in the height and the width of the moulding core can be achieved with the data example quoted above. Each hollow body 7 has a pressure connection and a closure. Pressure connections (connecting apparatuses 17) are also possible on both sides.

FIG. 6 shows a schematic perspective view of the finished fibre composite component 1 shown in FIG. 1, with moulding sections 14 in the form of stringers 20, after removal of the moulding cores 4.

During removal from the mould, the hollow bodies 7 have an internal pressure applied to them via the connecting apparatus such that the hollow bodies 7 return to their original extent, that is to say they contract and are detached from the wall and from the separating flexible tube. A negative pressure can also be applied, which leads to further contraction of the core, with the individual small tubes collapsing even further and, for example, collapsing such that they are flat. This makes it possible to very greatly reduce the cross section.

The moulding core 4 which has been shrunk down in this way can be removed from the cured moulding section 14, and can be reused. The core sleeve 9 can then likewise be removed, and this can particularly advantageously be done easily and also when a separating layer is present. The fibre composite component 1 can now be processed further. If reinforcing means 13 are present, these are likewise also removed, or remain in the fibre composite component 1.

A method is therefore provided for producing a fibre composite component, a corresponding moulding core and a corresponding fibre composite component, which can achieve a considerable material cost reduction in comparison to conventional methods with remaining core materials. The moulding core can be removed completely, thus making it possible to reduce the weight of the fibre composite component, in comparison to conventional moulding cores.

The invention is not restricted to the specific method illustrated in the figures for producing a fibre composite component for aerospace.

For example, the idea of the present invention is also applicable to fibre composite components in the field of sporting equipment and motor sports.

Furthermore, the geometry of the moulding core, in particular the wall thickness and diameter of the small tubes as well as their arrangement, can be modified in many ways.

Furthermore, a plurality of moulding cores can also be used in order to form a moulding core which is surrounded by fibre composite mats. The aim in this case is to provide a more complex geometry by means of the multiplicity of moulding cores. This allows more complex fibre composite components to be produced.

One alternative embodiment provides for the outer layer to be applied thicker in subareas, so that it is possible to vary the otherwise fixed core angle of 60° within certain limits.

The cross sections of the hollow bodies 7 need not necessarily be circular, when in the unpressurized state. Their diameters may likewise be different, in order in this way to create different corner radii.

The internal pressure must be regulated in order to ensure reproducible cross-sectional expansion.

The wall thickness of the hollow bodies 7 may also differ.

The invention claimed is:

1. A moulding core for producing a fibre composite component, such as a stringer on a base component for aerospace, having a predetermined number of hollow bodies, the hollow bodies extending in the longitudinal direction of the moulding core and being expandable elastically at least in their lateral direction to form an external geometry of the moulding core and being contractible at least in their lateral direction to return to their original extent by application of an internal pressure to the hollow bodies, the hollow bodies being fixed to one another, and the moulding core comprising a flexible outer layer in order to smooth the contour of its outer surfaces, and a core sleeve surrounding the moulding core, in order to seal the moulding core from the fibre composite component to be produced.

2. The moulding core according to claim 1, wherein the hollow bodies are fixed to one another on touching lines.

3. The moulding core according to claim 1, wherein the outer layer is widened inwards in order to smooth the contour of the outer surfaces of the moulding core, and also fills intermediate spaces between the hollow bodies, fixing being provided for the hollow bodies.

4. The moulding core according to claim 1, wherein the hollow bodies each have an approximately circular cross section.

5. The moulding core according to claim 1, wherein the hollow bodies are each composed of a thermoplastic material selected from the group consisting of aromatic polysulphides and polysulphones.

6. The moulding core according to claim 1, wherein the core sleeve is a flexible tube.

7. The moulding core according to claim 1, wherein the core sleeve has a separating layer, which forms an outer surface of the moulding core.

8. The moulding core according to claim 6, wherein the moulding core is formed from a polyamide and/or a PTFE plastic.

9. The moulding core according to claim 1, wherein reinforcing parts are arranged in the moulding core, in an area of transitions, which have to be formed with sharp edges, in an external geometry of the moulding core.

10. The moulding core according to claim 1, wherein reinforcing parts are arranged in the moulding core, the reinforcing parts being corner profile parts composed of metal and/or plastic.

11. The moulding core according to claim 1, wherein the moulding core is Ω-shaped, trapezoidal, triangular, annular and/or wavy.

12. The moulding core according to claim 1, wherein the ends of the hollow bodies are closed on one side and are provided on the other side with a connecting apparatus for application of a pressure medium, or are provided with a connecting apparatus on both sides.

13. An arrangement for producing a fibre composite component, in particular for aerospace, the arrangement comprising:
  a moulding core for producing a fibre composite component, such as a stringer on a base component for aerospace, having a predetermined number of hollow bodies, the hollow bodies extending in the longitudinal direction of the moulding core and being expandable elastically at least in their lateral direction to form an external geometry of the moulding core and being contractible at least in their lateral direction to return to their original extent by application of an internal pressure to the hollow bodies, the hollow bodies being fixed to one another, and the moulding core comprising:
    a flexible outer layer in order to smooth the contour of its outer surfaces, and
    a core sleeve surrounding the moulding core, in order to seal the moulding core from the fibre composite component to be produced, wherein first ends of the moulding bodies are closed by closures; and
  a connecting apparatus connectable to the moulding core, wherein second ends of the hollow bodies are each connected to the connecting apparatus, the connecting apparatus being adapted to apply an internal pressure to the hollow bodies by a pressure generating device to expand them elastically at least in their lateral direction to form an external geometry of the moulding core, and to contract them at least in their lateral direction to return them to their original extent.

* * * * *